United States Patent
Greenberg et al.

(10) Patent No.: US 10,519,864 B2
(45) Date of Patent: Dec. 31, 2019

(54) DUAL INLINE STARTER AIR VALVE

(71) Applicant: HAMILTON SUNDSTRAND CORPORATION, Charlotte, NC (US)

(72) Inventors: Michael D. Greenberg, Bloomfield, CT (US); Myles R. Kelly, Willimantic, CT (US); Robert Goodman, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 360 days.

(21) Appl. No.: 15/410,988

(22) Filed: Jan. 20, 2017

(65) Prior Publication Data
US 2018/0209349 A1 Jul. 26, 2018

(51) Int. Cl.
*F02C 7/27* (2006.01)
*B64F 1/34* (2006.01)
*F16K 31/42* (2006.01)

(52) U.S. Cl.
CPC .................. *F02C 7/27* (2013.01); *B64F 1/34* (2013.01); *F16K 31/42* (2013.01); *F05D 2220/323* (2013.01); *F05D 2270/021* (2013.01); *F05D 2270/301* (2013.01)

(58) Field of Classification Search
CPC . F02C 7/27; F16K 1/126; F16K 31/42; Y10T 137/353
See application file for complete search history.

(56) References Cited

U.S. PATENT DOCUMENTS

| 3,297,047 | A |   | 1/1967  | Sime |
|-----------|---|---|---------|------|
| 3,734,121 | A | * | 5/1973  | Rowe .................. G05D 16/106 |
|           |   |   |         | 137/220 |
| 3,792,716 | A |   | 2/1974  | Sime et al. |
| 3,915,587 | A |   | 10/1975 | Rannenberg |

(Continued)

FOREIGN PATENT DOCUMENTS

EP 3045699 A1 7/2016

OTHER PUBLICATIONS

EP EP Extended European Search Report for Application No. 18152830.8; Report dated Jun. 20, 2018; Report dated Jun. 27, 2018; 1-9 pages.

(Continued)

*Primary Examiner* — Eric Keasel
*Assistant Examiner* — Kevin R Barss
(74) *Attorney, Agent, or Firm* — Cantor Colburn LLP

(57) ABSTRACT

A starter air valve comprising: a housing comprising an inlet at a first end, an outlet at a second end opposite the first end, and a center portion between first end and second end, the outlet being fluidly connected to the inlet through a fluid passage; a first piston located within the housing between the first end and center portion, the first piston comprising: a first cupped portion configured to form a first chamber with the housing proximate the first end; and a second piston located within the housing between the second end and center portion, the second piston comprising: a third cupped portion configured to form a third chamber with the housing proximate the second end; wherein the pistons are configured to regulate airflow through the fluid passage by adjusting at least one of a first pressure within the first chamber and a third pressure within the third chamber.

20 Claims, 5 Drawing Sheets

(56) References Cited

U.S. PATENT DOCUMENTS

| | | | |
|---|---|---|---|
| 4,008,733 A * | 2/1977 | Courant | B64F 1/28 |
| | | | 137/220 |
| 4,885,909 A | 12/1989 | Rodgers | |
| 4,967,793 A * | 11/1990 | Gill | F16K 47/04 |
| | | | 137/557 |
| 5,042,963 A | 8/1991 | Sorenson et al. | |
| 5,417,246 A * | 5/1995 | Perkins | A61M 1/0031 |
| | | | 137/870 |
| 5,540,252 A * | 7/1996 | Bruun | G05D 7/0146 |
| | | | 137/220 |
| 6,446,657 B1 | 9/2002 | Dziorny et al. | |
| 8,899,598 B2 * | 12/2014 | Frank | F16K 31/0651 |
| | | | 137/565.18 |
| 8,910,653 B2 * | 12/2014 | McAuliffe | F16K 31/12 |
| | | | 137/220 |
| 9,157,374 B2 | 10/2015 | Cortelli et al. | |
| 9,689,315 B2 | 6/2017 | Marocchini et al. | |
| 9,849,992 B2 | 12/2017 | Goodman et al. | |
| 9,957,899 B1 * | 5/2018 | Greenberg | F02C 7/277 |
| 2011/0240126 A1 | 10/2011 | Lymberopoulos et al. | |
| 2014/0060076 A1 | 3/2014 | Cortelli et al. | |
| 2016/0237915 A1 | 8/2016 | Villanueva et al. | |
| 2017/0234237 A1 | 8/2017 | Pech et al. | |

OTHER PUBLICATIONS

EP Extended European Search Report for Application No. 18152778.9; Report dated Jun. 20, 2018; Report dated Jun. 27, 2018; 1-9 pages.

Extended European Search Report for Application No. 18152771.4; Report dated Jun. 19, 2018; Report dated Jun. 21, 2018; 1-7 pages.

* cited by examiner

DUAL INLINE STARTER AIR VALVE

BACKGROUND

The subject matter disclosed herein generally relates to air valves and, more particularly, to air valves of starters for aircraft engines.

Gas turbine engines used on modern aircraft are composed of a compressor, a combustion chamber, a turbine, and a main shaft connecting the turbine to the compressor. External air is compressed by the compressor and sent to the combustion chamber where an air-gas mixture combusts and provides thrust to the aircraft as it exits the engine. The combusted air-gas mixture also rotates the turbine as it exits the engine and the turbine rotates the compressor through the main shaft. At various times, the main shaft may need to be slowly rotated or motored to maintain thermal equilibrium throughout the engine.

In one example, after shutdown, the aircraft engine main shaft begins to bow due to thermal properties which can result in the rotor tips contacting the case wear path. This bowed condition is called the bowed rotor condition (BRC). The BRC creates the need for sub-idle motoring to cool the engine. When performing a manual start using a starter air valve manual override feature, the technicians cannot easily achieve the proper motoring speed and can cause an over speed condition which results in damage to the engine. A more efficient air valve design is desired.

SUMMARY

According to one embodiment, a starter air valve is provided. The starter air valve comprising: a housing comprising an inlet at a first end, an outlet at a second end opposite the first end, and a center portion between the first end and the second end, the outlet being fluidly connected to the inlet through a fluid passage; a first piston located within the housing between the first end and the center portion, the first piston comprising: a first cupped portion configured to form a first chamber with the housing proximate the first end; and a second cupped portion opposite the first cupped portion, the second cupped portion being configured to form a second chamber with the housing proximate the center portion; and a second piston located within the housing between the second end and the center portion, the second piston comprising: a third cupped portion configured to form a third chamber with the housing proximate the second end; and a fourth cupped portion opposite the third cupped portion, the fourth cupped portion being configured to form a fourth chamber with the housing proximate the center portion; wherein the first piston is configured to regulate airflow through the fluid passage by adjusting at least one of a first pressure within the first chamber and a second pressure within the second chamber; wherein the second piston is configured to regulate airflow through the fluid passage by adjusting at least one of a third pressure within the third chamber and a fourth pressure within the fourth chamber.

In addition to one or more of the features described above, or as an alternative, further embodiments of the starter air valve may include that a first outer wall of the first cupped portion is configured to extend across the fluid passage and block the airflow through the fluid passage when the first pressure is decreased relative to the second pressure.

In addition to one or more of the features described above, or as an alternative, further embodiments of the starter air valve may include that a second outer wall of the third cupped portion is configured to extend across the fluid passage and block the airflow through the fluid passage when the third pressure is decreased relative to the fourth pressure.

In addition to one or more of the features described above, or as an alternative, further embodiments of the starter air valve may include that the first piston and the second piston are inline along a common center axis.

In addition to one or more of the features described above, or as an alternative, further embodiments of the starter air valve may include that the second pressure within the second chamber is equal to about a selected percentage of a supply pressure at the inlet.

In addition to one or more of the features described above, or as an alternative, further embodiments of the starter air valve may include: an orifice divider network fluidly connecting the second pressure chamber to the fluid passage at a first orifice proximate the inlet, the orifice divider network is configured to provide air from the fluid passage to the second pressure chamber at the selected percentage of the supply pressure at the inlet.

In addition to one or more of the features described above, or as an alternative, further embodiments of the starter air valve may include a solenoid valve configured to adjust the first pressure.

In addition to one or more of the features described above, or as an alternative, further embodiments of the starter air valve may include a torque motor valve configured to adjust the third pressure.

In addition to one or more of the features described above, or as an alternative, further embodiments of the starter air valve may include a torque motor valve configured to adjust the first pressure.

In addition to one or more of the features described above, or as an alternative, further embodiments of the starter air valve may include a solenoid valve configured to adjust the third pressure.

In addition to one or more of the features described above, or as an alternative, further embodiments of the starter air valve may include a pressure sensor configured to detect airflow pressure within the fluid passage and activate an alarm when airflow pressure within the fluid passage is below a selected fluid passage air pressure.

In addition to one or more of the features described above, or as an alternative, further embodiments of the starter air valve may include that: the first pressure within the first chamber acts on a first surface and the second pressure within the second chamber acts on a second surface directly opposite the first surface; and the third pressure within the third chamber acts on a third surface and the fourth pressure within the fourth chamber acts on a fourth surface directly opposite the third surface.

In addition to one or more of the features described above, or as an alternative, further embodiments of the starter air valve may include that a surface area of the first surface is greater surface area than a surface area of the second surface.

In addition to one or more of the features described above, or as an alternative, further embodiments of the starter air valve may include that the surface area of the first surface is about twice the surface area of the second surface.

In addition to one or more of the features described above, or as an alternative, further embodiments of the starter air valve may include that a surface area of the third surface is greater surface area than a surface area of the fourth surface.

In addition to one or more of the features described above, or as an alternative, further embodiments of the starter air valve may include that the surface area of the third surface is about twice the surface area of the fourth surface.

In addition to one or more of the features described above, or as an alternative, further embodiments of the starter air valve may include an ambient fluid network fluidly connecting air located outside of the housing to the fourth chamber, the ambient fluid network configured to provide air from the outside of the housing to the fourth chamber at about an ambient pressure.

According to another embodiment, a method of operating a starter air valve comprising a housing having an inlet at a first end, an outlet at a second end opposite the first end, and a center portion between the first end and the second end, the outlet being fluidly connected to the inlet through a fluid passage is provided. The method comprising: regulating the airflow through the fluid passage using a first piston located within the housing between the first end and the center portion, the first piston comprising: a first cupped portion configured to form a first chamber with the housing proximate the first end; and a second cupped portion opposite the first cupped portion, the second cupped portion being configured to form a second chamber with the housing proximate the center portion; and regulating the airflow through the fluid passage using a second piston located within the housing between the second end and the center portion, the second piston comprising: a third cupped portion configured to form a third chamber with the housing proximate the second end; and a fourth cupped portion opposite the third cupped portion, the fourth cupped portion being configured to form a fourth chamber with the housing proximate the center portion; wherein the first piston is configured to regulate airflow through the fluid passage by adjusting at least one of a first pressure within the first chamber and a second pressure within the second chamber; wherein the second piston is configured to regulate airflow through the fluid passage by adjusting at least one of a third pressure within the third chamber and a fourth pressure within the fourth chamber.

In addition to one or more of the features described above, or as an alternative, further embodiments of the method may include blocking the airflow through the fluid passage using a first outer wall of the first cupped portion, the first outer wall being configured to extend across the fluid passage when the first pressure is decreased relative to the second pressure.

In addition to one or more of the features described above, or as an alternative, further embodiments of the method may include blocking the airflow through the fluid passage using a second outer wall of the third cupped portion, the second outer wall being configured to extend across the fluid passage when the third pressure is decreased relative to the fourth pressure.

Technical effects of embodiments of the present disclosure include a dual inline start air valve configured to ensure proper airflow to an engine upon startup and thermodynamic motoring using a first piston and a second piston to regulate airflow through the valve and to the engine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
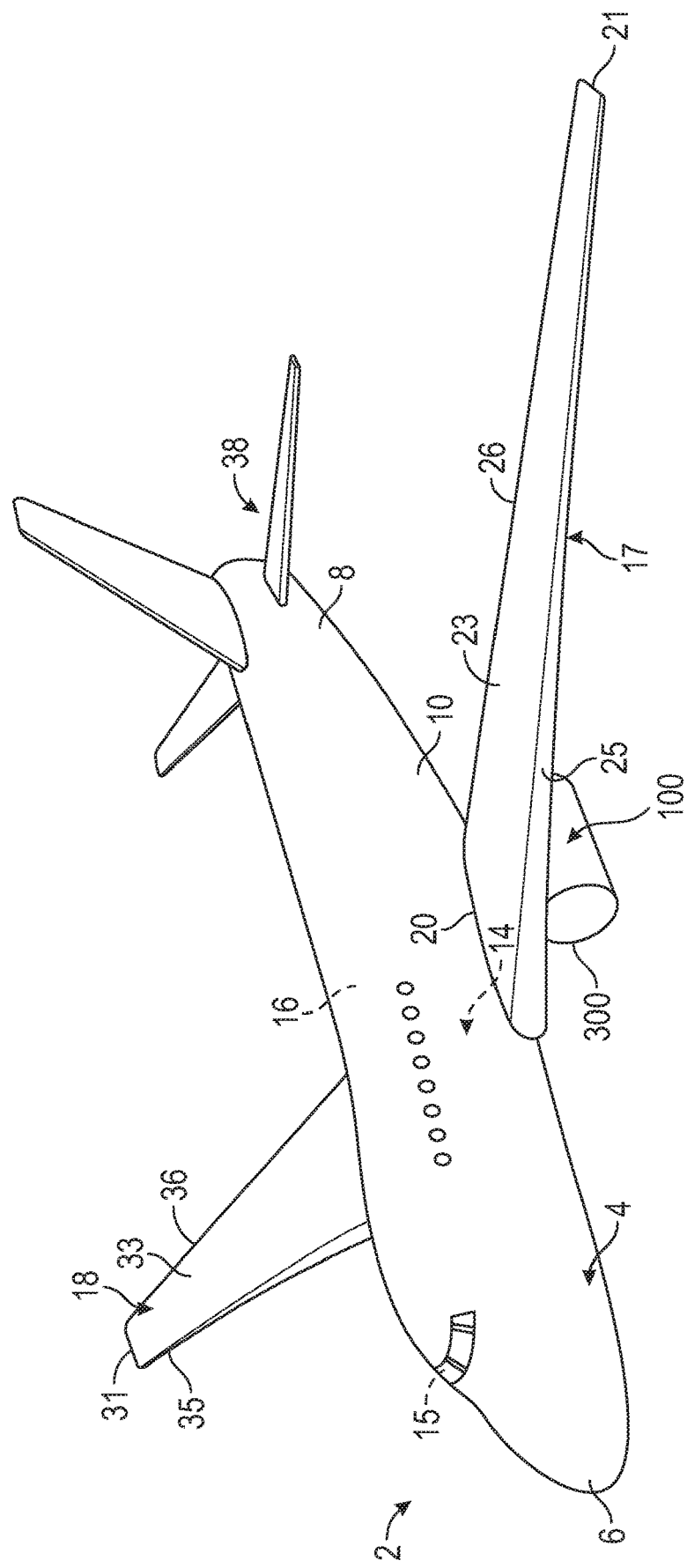
FIG. 1 is a schematic diagram of an aircraft that may incorporate various embodiments of the present disclosure.

Referring now to FIG. 1, which shows a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 300 configured to provide propulsion to the aircraft 2 and a dual inline starter air valve 100 configured to regulate airflow to an air turbine starter 301 (see FIG. 2) of the engine 300.

Figure 2:
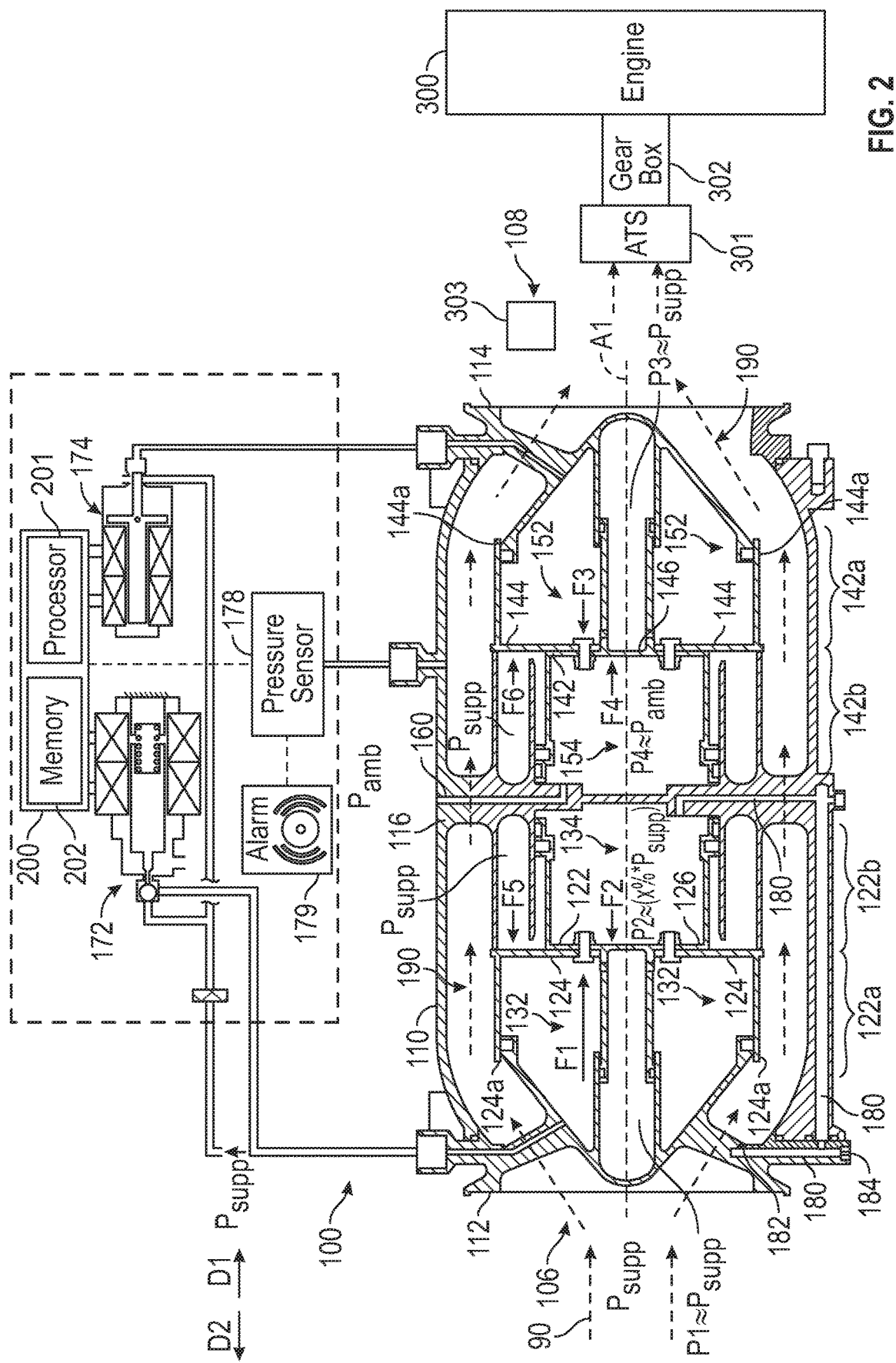
FIG. 2 is a schematic, cross-sectional illustration of a dual inline starter air valve with two pistons in an open position, in accordance with an embodiment of the present disclosure.
Figure 3:
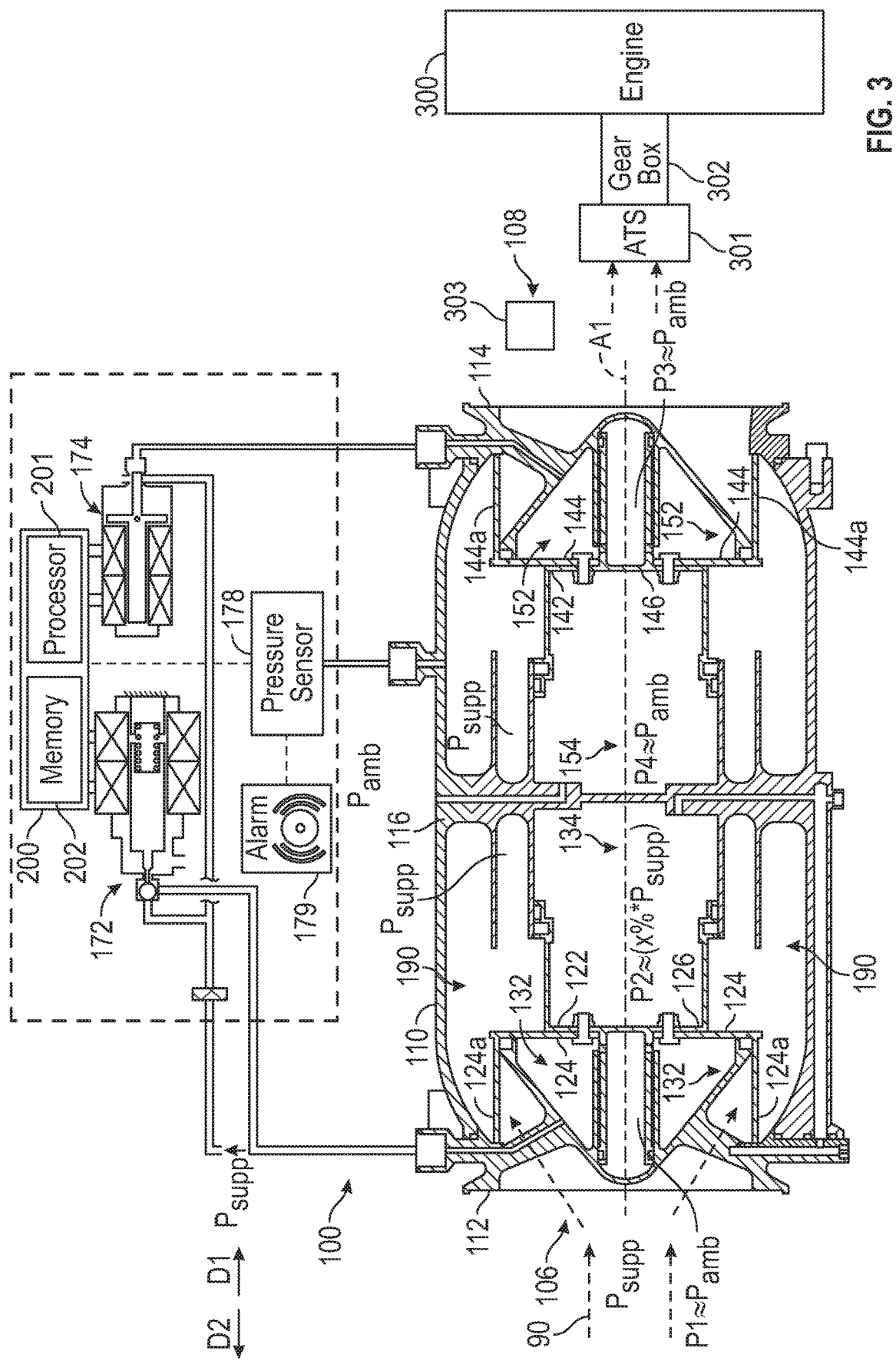
FIG. 3 is a schematic, cross-sectional illustration of a dual inline starter air valve with two pistons in a closed position, in accordance with an embodiment of the present disclosure.
Figure 4:
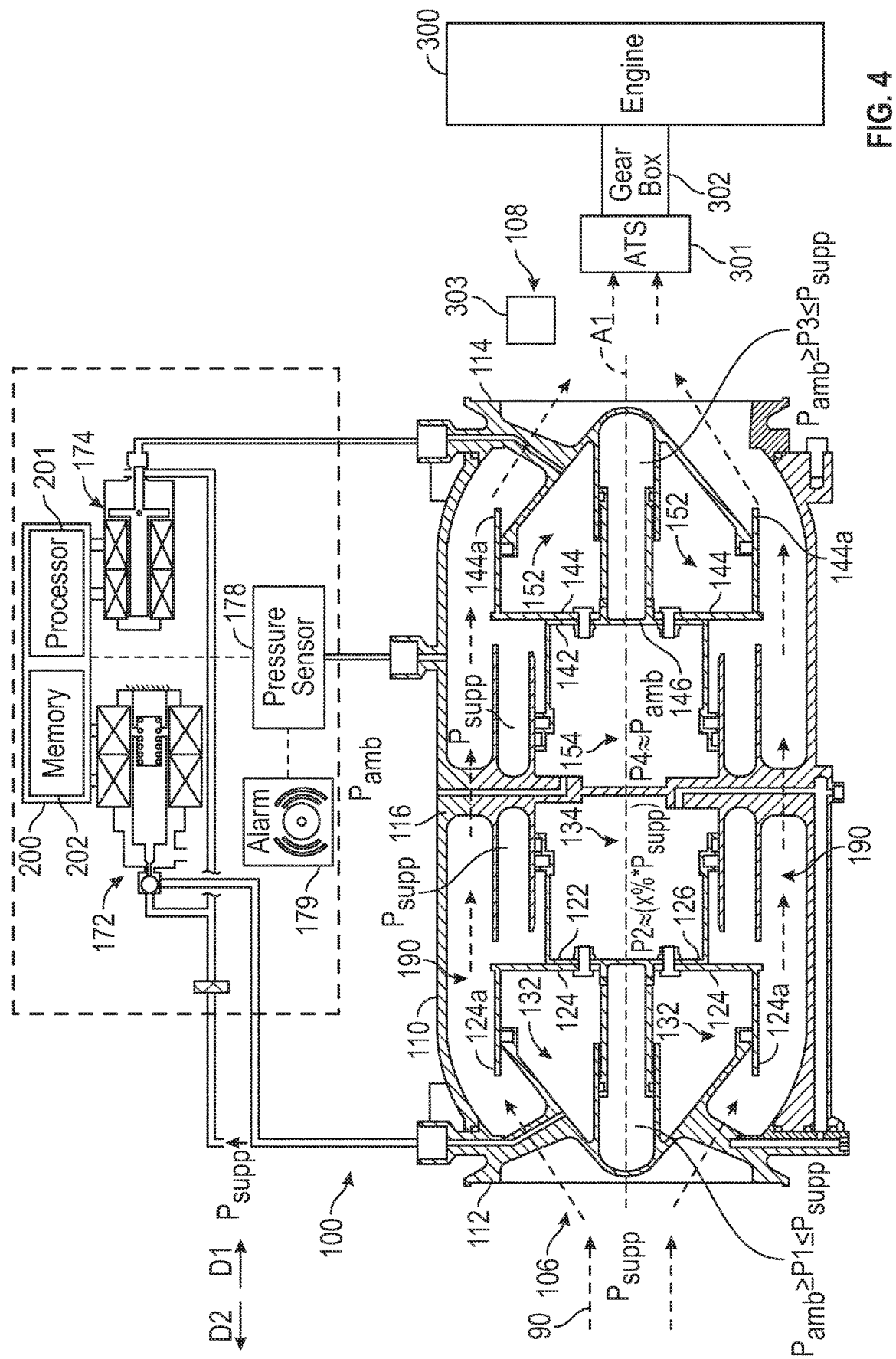
FIG. 4 is a schematic, cross-sectional illustration of a dual inline starter air valve with two pistons in a modulating position, in accordance with an embodiment of the present disclosure.

Referring now to FIGS. 2-4, the dual inline starter air valve 100 is illustrated according to an embodiment of the present disclosure. As shown in FIGS. 2-4, the air valve 100 comprises a housing 110, a first piston 122, and a second piston 142. The housing comprises an inlet 106 at a first end 112, an outlet 108 at a second end 114 opposite the first end 112, and a center portion 116 between the first end 112 and the second end 114. The outlet 108 is fluidly connected to the inlet 106 through a fluid passage 190. The center portion is a wall about half way between the first end 112 and the second end 114.

As seen in FIGS. 2-4, the first piston 122 is located within the housing 110 between the first end 112 and the center portion 116. The first piston 122 comprises a first cupped portion 122a configured to form a first chamber 132 with the housing 110 proximate the first end 112. The first chamber 132 is filled with a fluid (ex: air) to create a first pressure P1 within the first chamber 132. The first pressure P1 acts on a first surface 124 of the first piston 122. The first piston 122 also comprises second cupped portion 122b opposite the first cupped portion 122a. The second cupped portion 122b is configured to form a second chamber 134 with the housing 110 proximate the center portion 116. The second chamber 134 is filled with a fluid (ex: air) to create a second pressure P2 within the second chamber 134. The second pressure P2 acts on a second surface 126 of the first piston. The second surface 126 is opposite the first surface 124.

The first piston 122 translates in either the first direction D1 or second direction D2 in response to the first pressure P1 and the second pressure P2. The first pressure P1 applied over the surface area of the first surface 124 creates a first force F1. The second pressure P2 applied over the surface area of the second surface 126 creates a second force F2 opposite the first force F1. A fifth force F5 is created by the supply pressure $P_{supp}$ and the differential area between the first surface 124 and the second surface 126. Thus, the balance of forces F1, F2, F5 will cause the first piston 122 to move in either the first direction D1 or the second direction D2. If the first force F1 is greater than the second force F2 and the fifth force F5 combined, then the first piston 122 moves in the first direction D1. If the second force F2 and the fifth force F5 is greater than the first force F1, then the first piston 122 moves in the second direction D2. If the second force F2 and the fifth force F5 combined is balanced with the first force F1 then the first piston 122 will not move. In an embodiment, the first surface 124 may have a different surface area than the second surface 126. In another embodiment, the first surface 124 may have a larger surface area than the second surface 126. In yet another embodiment, the first surface 124 may have about twice the surface area as the second surface 126.

As seen in FIGS. 2-4 the second piston 142 is located within the housing 110 between the second end 114 and the center portion 116. The second piston 142 comprises a third cupped portion 142a configured to form a third chamber 152 with the housing 110 proximate the second end 114. The third chamber 152 is filled with a fluid (ex: air) to create a third pressure P3 within the third chamber 152. The third pressure P3 acts on a third surface 144 of the second piston 142. The second piston 142 also comprises fourth cupped portion 142b opposite the third cupped portion 142a. The fourth cupped portion 142b is configured to form a fourth chamber 154 with the housing 110 proximate the center portion 116. The fourth chamber 154 is filled with a fluid (ex: air) to create a fourth pressure P4 within the fourth chamber 154. The fourth pressure P4 acts on a fourth surface 146 of the second piston 142. The fourth surface 146 is opposite the third surface 144.

The second piston 142 translates in either the first direction D1 or second direction D2 in response to the third pressure P3 and the fourth pressure P4. The third pressure P3 applied over the surface area of the third surface 144 creates a third force F3. The fourth pressure P4 applied over the surface area of the fourth surface 146 creates a fourth force F4 opposite the third force F3. A sixth force F6 is created by the supply pressure $P_{supp}$ and the differential area between the third surface 144 and the fourth surface 146. Thus, the balance of forces F3, F4, F6 will cause the second piston 142 to move in either the first direction D1 or the second direction D2. If the third force F3 is greater than the fourth force F4 and the sixth force F6 combined, then the second piston 142 moves in the second direction D2. If the fourth force F4 and the sixth force F6 combined is greater than the third force F3, then the second piston 142 moves in the first direction D1. If the fourth force F4 and sixth force F6 combined are balanced with the third force then the second piston 142 will not move. In an embodiment, the third surface 144 may have a different surface area than the fourth surface 146. In another embodiment, the third surface 144 may have a larger surface area than the fourth surface 146. In yet another embodiment, the third surface 144 may have about twice the surface area as the fourth surface 146.

The airflow 90 moving out of the outlet 108 will move into an air turbine starter 301. The air turbine starter 301 is rotated by the airflow 90 and transfers the rotational energy through a gearbox 302 to the combustion engine 300. The speed of the engine established by airflow 90 from the outlet 108 may be monitored by a speed sensor 303 and communicated to a controller 200. The controller 200, in response to the airflow 90, may then command an adjustment of pressures P1, P3 within the first chamber 132 and the third chamber 152 to move the pistons 122, 142 and regulate the airflow 90. Thus, the first piston 122 and the second piston 142 are configured to regulate airflow 90 through the fluid passage 190. In an embodiment, the first piston 122 and the second piston 142 are inline along a common center axis A1, as seen in FIGS. 2-4.

The first piston 122 is configured to regulate airflow 90 through the fluid passage 190 (and subsequently regulate the airflow 90 to the air turbine starter 301) by adjusting at least one of the first pressure P1 within the first chamber 132 and the second pressure P2 within the second chamber 134. The first piston 122 allows airflow through the fluid passage 190 when the first piston 122 is in the open position, as seen in FIG. 2. The first piston 122 blocks airflow through the fluid passage 190 when the first piston 122 is in the closed position, as seen in FIG. 3. While in the closed position, a first outer wall 124a of the first piston 122 extends across the fluid passage 190 to block the airflow 90 through the fluid passage 190. Further, depending on the balance between the first pressure P1 and the second pressure P2, the first piston 122 may be located in-between the open position of FIG. 2 and the closed position of FIG. 3, thus allowing the first outer wall 124a to only partially block the fluid passageway 190, as seen in FIG. 4. The airflow 90 through the fluid passageway 190 may be incrementally adjusted by incrementally blocking the fluid passageway 190 with the first outer wall 124a.

The second piston 142 is configured to regulate airflow 90 through the fluid passage 190 (and subsequently regulate the airflow 90 to the air turbine starter 301) by adjusting at least one of the third pressure P3 within the third chamber 152 and the fourth pressure P4 within the fourth chamber 154. The second piston 142 allows airflow through the fluid passage 190 when the second piston 142 is in the open position, as seen in FIG. 2. The second piston 142 blocks airflow through the fluid passage 190 when the second piston 142 is in the closed position, as seen in FIG. 3. While in the closed position, a second outer wall 144a of the second piston 142 extends across the fluid passage 190 to block the airflow 90 through the fluid passage 190. Further, depending on the balance between the third pressure P3 and the fourth pressure P4, the second piston 142 may be located in-between the open position of FIG. 2 and the closed position of FIG. 3, thus allowing the second outer wall 144a to only partially block the fluid passageway 190, as seen in FIG. 4. The airflow 90 through the fluid passageway 190 may be incrementally adjusted by incrementally blocking the fluid passageway 190 with the second outer wall 144a.

As may be appreciated by one of skill in the art, the pressure being supplied to each chamber 132, 134, 152, 154 may be supplied by various means. In the illustrated embodiment, the first pressure P1 within the first chamber 132 is supplied by solenoid valve 172 and the third pressure P3 within the third chamber 152 is supplied by a torque motor valve 174. The solenoid valve 172 is fluidly connected to the first chamber 132 and the torque motor valve 174 is fluidly connected the third chamber 152. The solenoid valve 172 is configured to adjust the first pressure P1 to the first chamber 132 and the torque motor valve 174 is configured to adjust the third pressure P3. In an alternate embodiment, the solenoid valve 172 may be fluidly connected to the third chamber 152 and configured to adjust the third pressure P3. In an alternate embodiment, the torque motor valve 174 may be fluidly connected to the first chamber 132 and configured to adjust the first pressure P1.

In the illustrated embodiment, the second pressure P2 within the second chamber 134 is supplied by an orifice divider network 180 fluidly connecting the second pressure chamber 134 to the fluid passage 190 at a first orifice 182, as shown in FIG. 2. The orifice divider network 180 is configured to provide airflow 90 from the fluid passage 190 to the second pressure chamber 134 at the selected percentage x % of the supply pressure $P_{supp}$ at the inlet 106. In an embodiment, the selected percentage x % is about 80% and thus the second pressure P2 is equal to about $0.8*P_{supp}$. The orifice divider network 180 is configured to achieve a second pressure P2 equal to about $0.8*P_{supp}$ utilizing a first orifice 182 and a second orifice 184. As may be appreciated by one of skill in the art, the orifice divider network 180 may utilize more or less than two orifices in order to achieve the selected percentage. In an embodiment, the first orifice 182 may have a diameter of about 0.050 inches (0.127 cm). In another embodiment, the second orifice 184 may have a diameter of about 0.050 inches (0.127 cm). Advantageously, the orifice divider network 180 ensures a higher opening force margin than would otherwise be present if supply pressure was ported to chamber 132.

In the illustrated embodiment, the fourth pressure P4 within the fourth chamber 154 supplied by an ambient fluid network 160 fluidly connecting air located outside of the housing 110 to the fourth chamber 154. The ambient fluid network 160 is configured to provide air from the outside of the housing 110 to the fourth chamber at about an ambient pressure $P_{amb}$, thus the fourth pressure P4 is equal to about the ambient pressure $P_{amb}$ of the air outside the housing 110.

As mentioned above, the first piston 122 is configured to regulate airflow 90 through the fluid passage 190 (and subsequently regulate the airflow 90 to the air turbine starter 301) by adjusting at least one of the first pressure P1 within the first chamber 132 and the second pressure P2 within the second chamber 134. In the illustrated embodiment, the second pressure P2 may remain the same while the first pressure P1 is adjusted to move the first piston 122. As seen in FIG. 2, when the first piston 122 is in the open position, the first pressure P1 is equal to about $P_{supp}$ and the second pressure P2 is equal to about x %*$P_{supp}$. As mentioned above, in an embodiment, the selected percentage x % is about 80%. FIG. 3 shows the first piston 122 in the closed position. As seen in FIG. 3, when the first piston 122 is in the closed position, the first pressure P1 is equal to about $P_{amb}$ and the second pressure P2 is equal to about x %*$P_{supp}$. Thus, the first pressure P1 has been reduced from $P_{supp}$ in FIG. 2 to $P_{amb}$ in FIG. 3 to allow the first piston 122 to close and thus block off airflow 90 through the fluid passage 190. In the event that pressure is lost, the first piston 122 is configured to fail safe in the closed position, as seen in FIG. 3.

As mentioned above, the second piston 142 is configured to regulate airflow 90 through the fluid passage 190 (and subsequently regulate the airflow 90 to the air turbine starter 301) by adjusting at least one of the first pressure P3 within the third chamber 152 and the fourth pressure P4 within the fourth chamber 154. In the illustrated embodiment, the fourth pressure P4 may remain the same while the third pressure P3 is adjusted to move the second piston 142. As seen in FIG. 2, when the second piston 142 is in the open position, the third pressure P3 is equal to about $P_{supp}$ and the fourth pressure P4 is equal to about $P_{amb}$. FIG. 3 shows the second piston 142 in the closed position. As seen in FIG. 3, when the second piston 142 is in the closed position, the third pressure P3 is equal to about $P_{amb}$ and the fourth pressure P4 is equal to about $P_{amb}$. Thus, the third pressure P3 has been reduced from $P_{supp}$ in FIG. 2 to $P_{amb}$ in FIG. 3 to allow the second piston 142 to close and thus block off airflow 90 through the fluid passage 190. In the event that pressure is lost, the second piston 142 is configured to fail safe in the closed position, as seen in FIG. 3.

FIG. 4 shows, for illustration, both pistons 122, 142 in the modulating position. The modulating position is located in-between the open position of FIG. 2 and the closed position of FIG. 3. In an embodiment, only one piston 122, 142 may be in the modulating position shown in FIG. 4 at any given time, while the other piston is in the open position shown in FIG. 2. In an embodiment, the second piston 142 is in the modulating position shown in FIG. 4, while the first piston 122 is in the open position shown in FIG. 2. When the first piston 122 is the modulating position, the first outer wall 124a partially blocks the fluid passageway 190. When the second piston 142 is the modulating position, the second outer wall 144a partially blocks the fluid passageway 190. The airflow 90 through the fluid passageway 190 may be incrementally adjusted by incrementally blocking the fluid passageway 190 with the first outer wall 124a and/or second outer wall 144a. Thus, the airflow 90 delivered to the air turbine starter 301 from the outlet 108 may be incrementally adjusted. In one example, for a normal engine startup both pistons 122, 142 may be commanded open. In a second example, the first piston 122 may be open while the second piston may be modulated for bowed rotor motoring (BRM) where the engine 300 is controlled to rotate at a low speed until the thermal differential across the engine 300 is mitigated. Advantageously, having two pistons allows one to be manually opened in the event of a failure and the other piston to be modulated for BRM. In a single piston air valve, if the single piston fails, modulation is not possible because the single piston must be manually held open.

Additionally, the air valve 100 may also be operably connected to a controller 200. The controller 200 may be in operable communication with the torque motor valve 174, the solenoid valve 172, the speed sensor 303, and a pressure sensor 178. The control controller 200 may be configured control the operation of the movement of the pistons 122, 142 by adjusting the pressures P1, P3 in the chambers 132, 152. The controller 200 may include a processor 201 and an associated memory 202. The processor 201 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 202 may be but is not limited to a random access memory (RAM), read only memory (ROM), or other electronic, optical, magnetic or any other computer readable medium. The pressure sensor 178 is configured to measure the pressure of the airflow 90 through the fluid passageway 190 and communicate the pressure measurement to the controller 200. The pressure sensor 178 is configured to activate an alarm 179 when the airflow pressure within the fluid passage way 190 is below a selected pressure, which would indicate a piston failure. The alarm 179 may be audible and/or visual.

Figure 5:
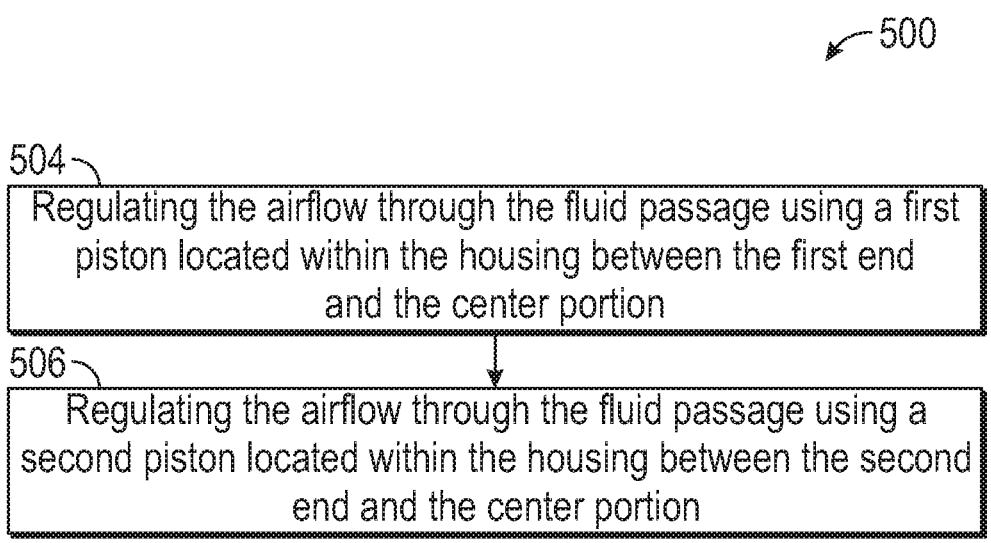
FIG. 5 is a flow process illustrating a method of operating the dual inline starter air valve FIGS. 2-4, according to an embodiment of the present disclosure.

Referring now to FIG. 5, with continued reference to FIGS. 2-4, FIG. 5 shows a flow process illustrating a method 500 of operating the isolation valve 200 of FIGS. 2-4, according to an embodiment of the present disclosure. At block 504, airflow 90 is regulated through the fluid passage 190 using a first piston 122 located within the housing 110 between the first end 112 and the center portion 116. The first piston 122 comprises: a first cupped portion 122a configured to form a first chamber 132 with the housing 110 proximate the first end 112; and a second cupped portion 122b opposite the first cupped portion 122a. The second cupped portion 122b is configured to form a second chamber 134 with the housing 110 proximate the center portion 116. The first piston 122 is configured to regulate airflow 90 through the fluid passage 190 by adjusting at least one of a first pressure P1 within the first chamber 132 and a second pressure P2 within the second chamber 132.

At block 506, airflow 90 is regulated through the fluid passage 190 using a second piston 142 located within the housing 110 between the second end 114 and the center portion 116. The second piston 142 comprises: a third cupped portion 142a configured to form a third chamber 152 with the housing 110 proximate the second end 114; and a fourth cupped portion 142b opposite the third cupped portion 142a. The fourth cupped portion 142b is configured to form a fourth chamber 154 with the housing 110 proximate the center portion 116. The second piston 142 is configured to regulate airflow 90 through the fluid passage 190 by adjusting at least one of a third pressure P3 within the third chamber 152 and a fourth pressure P4 within the fourth chamber 152.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A starter air valve comprising:
   a housing comprising an inlet at a first end, an outlet at a second end opposite the first end, and a center portion between the first end and the second end, the outlet being fluidly connected to the inlet through a fluid passage;
   a first piston located within the housing between the first end and the center portion, the first piston comprising:
   a first cupped portion configured to form a first chamber with the housing proximate the first end; and
   a second cupped portion opposite the first cupped portion, the second cupped portion being configured to form a second chamber with the housing proximate the center portion; and
   a second piston located within the housing between the second end and the center portion, the second piston comprising:
   a third cupped portion configured to form a third chamber with the housing proximate the second end; and
   a fourth cupped portion opposite the third cupped portion, the fourth cupped portion being configured to form a fourth chamber with the housing proximate the center portion,
   wherein the first piston is configured to regulate airflow through the fluid passage by adjusting at least one of a first pressure within the first chamber and a second pressure within the second chamber,
   wherein the second piston is configured to regulate airflow through the fluid passage by adjusting at least one of a third pressure within the third chamber and a fourth pressure within the fourth chamber,
   wherein movement of the first piston in either a first direction or a second direction is caused by a balance of forces created solely by the first pressure within the first chamber and the second pressure within the second chamber, and
   wherein movement of the second piston in either the first direction or the second direction is caused by a balance of forces created solely by the third pressure within the third chamber and the fourth pressure within the fourth chamber.

2. The starter air valve of claim 1, wherein:
   a first outer wall of the first cupped portion is configured to extend across the fluid passage and block the airflow through the fluid passage when the first pressure is decreased relative to the second pressure.

3. The starter air valve of claim 1, wherein:
   a second outer wall of the third cupped portion is configured to extend across the fluid passage and block the airflow through the fluid passage when the third pressure is decreased relative to the fourth pressure.

4. The starter air valve of claim 1, wherein:
   the first piston and the second piston are inline along a common center axis.

5. The starter air valve of claim 1, wherein:
   the second pressure within the second chamber is equal to about a selected percentage of a supply pressure at the inlet.

6. The starter air valve of claim 5, further comprising:
an orifice divider network fluidly connecting the second pressure chamber to the fluid passage at a first orifice proximate the inlet, the orifice divider network is configured to provide air from the fluid passage to the second pressure chamber at the selected percentage of the supply pressure at the inlet.

7. The starter air valve of claim 1, further comprising:
a solenoid valve configured to adjust the first pressure.

8. The starter air valve of claim 1, further comprising:
a torque motor valve configured to adjust the third pressure.

9. The starter air valve of claim 1, further comprising:
a torque motor valve configured to adjust the first pressure.

10. The starter air valve of claim 1, further comprising:
a solenoid valve configured to adjust the third pressure.

11. The starter air valve of claim 1, further comprising:
a pressure sensor configured to detect airflow pressure within the fluid passage and activate an alarm when airflow pressure within the fluid passage is below a selected fluid passage air pressure.

12. The starter air valve of claim 1, wherein:
the first pressure within the first chamber acts on a first surface and the second pressure within the second chamber acts on a second surface directly opposite the first surface; and
the third pressure within the third chamber acts on a third surface and the fourth pressure within the fourth chamber acts on a fourth surface directly opposite the third surface.

13. The starter air valve of claim 12, wherein:
a surface area of the first surface is greater surface area than a surface area of the second surface.

14. The starter air valve of claim 13, wherein:
the surface area of the first surface is about twice the surface area of the second surface.

15. The starter air valve of claim 12, wherein:
a surface area of the third surface is greater surface area than a surface area of the fourth surface.

16. The starter air valve of claim 15, wherein:
the surface area of the third surface is about twice the surface area of the fourth surface.

17. The starter air valve of claim 1, further comprising:
an ambient fluid network fluidly connecting air located outside of the housing to the fourth chamber, the ambient fluid network configured to provide air from the outside of the housing to the fourth chamber at about an ambient pressure.

18. A method of operating a starter air valve comprising a housing having an inlet at a first end, an outlet at a second end opposite the first end, and a center portion between the first end and the second end, the outlet being fluidly connected to the inlet through a fluid passage, the method comprising:
regulating the airflow through the fluid passage using a first piston located within the housing between the first end and the center portion, the first piston comprising:
a first cupped portion configured to form a first chamber with the housing proximate the first end; and
a second cupped portion opposite the first cupped portion, the second cupped portion being configured to form a second chamber with the housing proximate the center portion; and
regulating the airflow through the fluid passage using a second piston located within the housing between the second end and the center portion, the second piston comprising:
a third cupped portion configured to form a third chamber with the housing proximate the second end; and
a fourth cupped portion opposite the third cupped portion, the fourth cupped portion being configured to form a fourth chamber with the housing proximate the center portion;
wherein the first piston is configured to regulate airflow through the fluid passage by adjusting at least one of a first pressure within the first chamber and a second pressure within the second chamber,
wherein the second piston is configured to regulate airflow through the fluid passage by adjusting at least one of a third pressure within the third chamber and a fourth pressure within the fourth chamber,
wherein movement of the first piston in either a first direction or a second direction is caused by a balance of forces created solely by the first pressure within the first chamber and the second pressure within the second chamber, and
wherein movement of the second piston in either the first direction or the second direction is caused by a balance of forces created solely by the third pressure within the third chamber and the fourth pressure within the fourth chamber.

19. The method of claim 18, further comprising:
blocking the airflow through the fluid passage using a first outer wall of the first cupped portion, the first outer wall being configured to extend across the fluid passage when the first pressure is decreased relative to the second pressure.

20. The method of claim 18, further comprising:
blocking the airflow through the fluid passage using a second outer wall of the third cupped portion, the second outer wall being configured to extend across the fluid passage when the third pressure is decreased relative to the fourth pressure.

* * * * *